United States Patent [19]

Stupica

[11] 4,133,765

[45] Jan. 9, 1979

[54] DEVICE FOR RETRIEVING FLOATING POLLUTANTS ON SURFACE WATER

[76] Inventor: Vekoslav A. Stupica, 2911 N. 73rd Pl., Kansas City, Kans. 66109

[21] Appl. No.: 835,041

[22] Filed: Sep. 21, 1977

[51] Int. Cl.² .............................................. E02B 15/04
[52] U.S. Cl. .................................. 210/242 S; 405/63; 210/DIG. 25
[58] Field of Search ........... 61/1 F; 210/73 W, 242 S, 210/DIG. 25

[56] References Cited

U.S. PATENT DOCUMENTS

| | | | |
|---|---|---|---|
| 3,650,406 | 3/1972 | Brown et al. | 210/DIG. 25 |
| 3,653,510 | 4/1972 | Fitzgerald | 210/242 S |
| 3,686,870 | 8/1972 | Blomberg | 210/DIG. 25 M |
| 3,847,816 | 11/1974 | DiPerna | 210/242 S |
| 3,983,034 | 9/1976 | Wilson | 210/73 W |
| 4,006,082 | 2/1977 | Irons | 210/242 S |

*Primary Examiner*—Theodore A. Granger

*Attorney, Agent, or Firm*—Schmidt, Johnson, Hovey & Williams

[57] ABSTRACT

Oil spill retrieval apparatus of the type employing a floating flexible barrier, has an oil reservoir tank coupled with the barrier in such manner that oil is conveyed from the barrier to the tank by gravity flow. An oil intake tube interconnecting the barrier and storage tank has an outlet coupled with the tank at an elevation below the water surface, and an opposed mouth floatingly supported on the surface of the water in flow communication with the flexible barrier. In preferred forms, the mouth is provided with a one-way gate precluding backflow of collected oil, and has an inflatible bladder permitting selective vertical adjustment of the mouth relative to the flexible barrier and tube outlet. One form of the invention contemplates the use of a buoyant skimmer in combination with the floatingly supported mouth to enhance oil separation in calm water operations.

1 Claim, 7 Drawing Figures

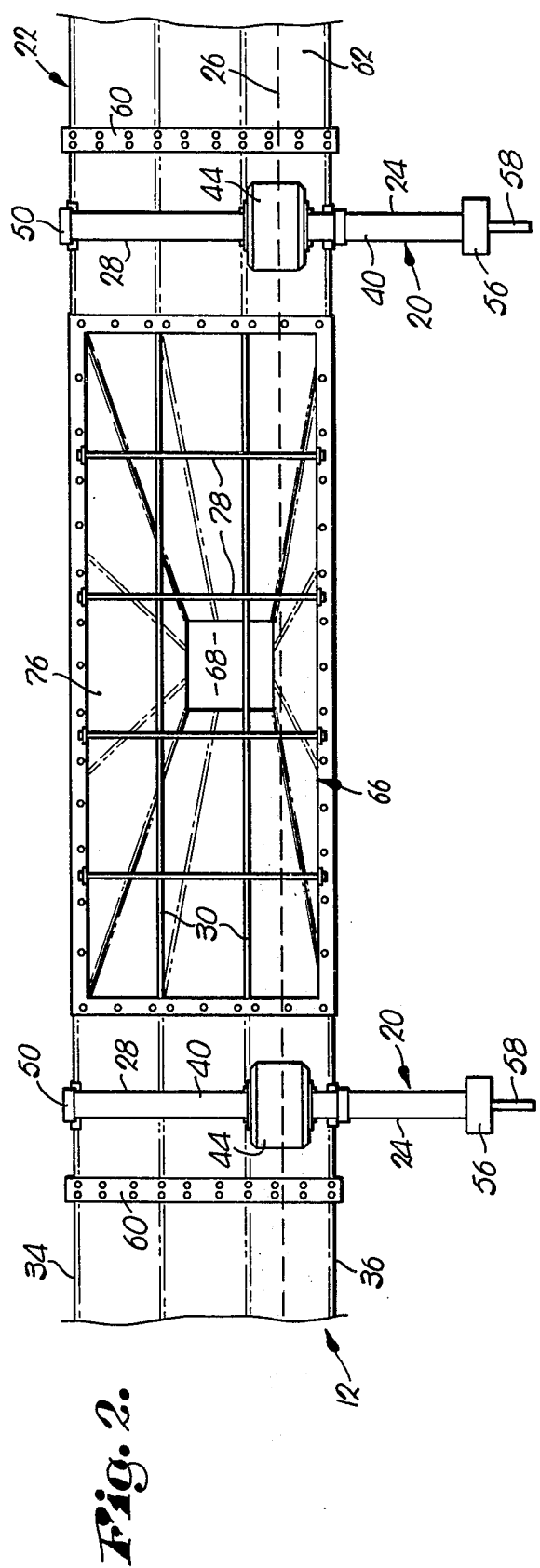
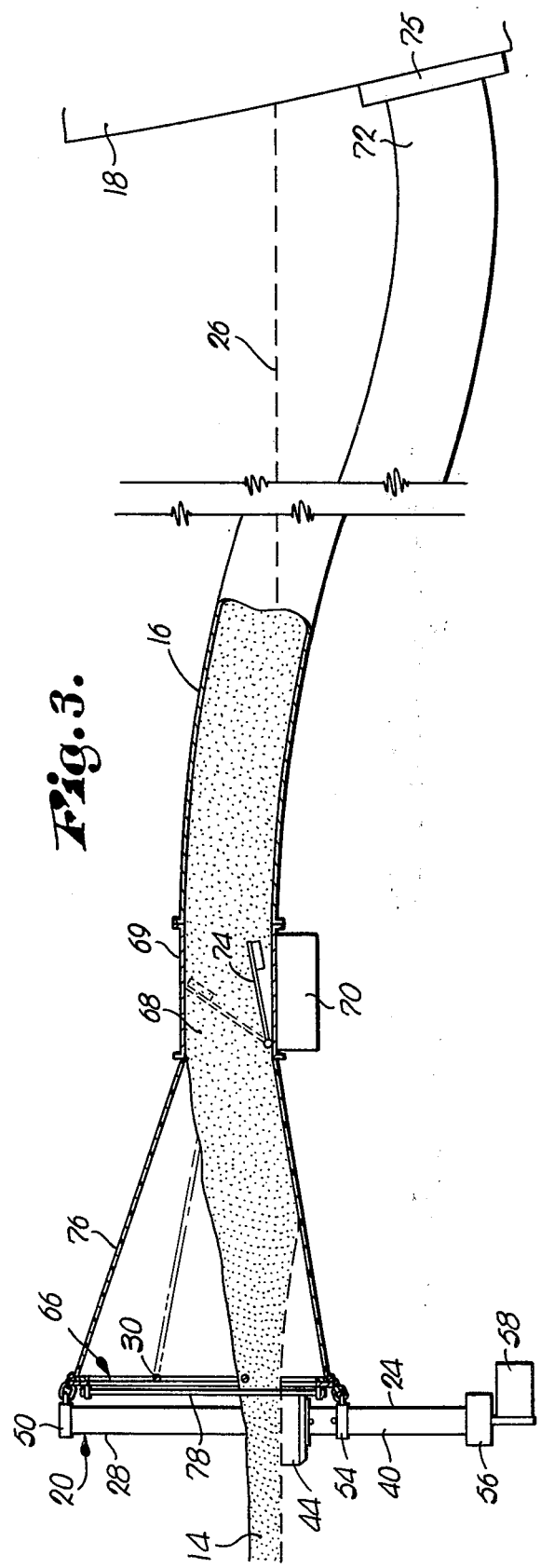
Fig. 2.
Fig. 3.

DEVICE FOR RETRIEVING FLOATING POLLUTANTS ON SURFACE WATER

This invention relates to devices for removing surface contaminants from a body of water and particularly concerns a retrieval apparatus of the type employing a flexible contaminant-confining fence in combination with a reservoir which receives contaminants collected by the fence without the need for pumps or other mechanical conveying devices.

With the recent dramatic increase in oil production and transportation, there has resulted a corresponding alarming increase in the number of large oil spills in the open seas as well as in navigable waterways. Damage to even a moderate sized oil tanker can result in the leakage of thousands of barrels of oil into the waters around the tanker, and a blow-out in an off shore oil rig, such as recently occurred in the North Sea, can result in literally millions of barrels of oil being dumped into the sea. In addition to losses due to the intrinsic value of the oil itself, such large oil spills are environmentally undesirable, often resulting in mass killing of marine life and frequently despoiling large sections of shore line.

Devices for collecting oil spills and other contaminants from the surface of a body of water are well known in the art as evidenced by the U.S. Letters Patent to Muramatsu et al 3,771,662 and Wilson 3,983,034. Muramatsu shows the use of a flexible recovery fence adapted to be propelled through the water for directing surface contaminants to a rearmost holding compartment where they are subsequently pumped to a transport ship for conveyance as desired. A similar device is disclosed in Wilson which employs a flexible boom to channel contaminants into a weir-controlled sump; the contaminants are subsequently pumped to a companion vessel containing settling tanks for separation from residual water. Other similar devices are disclosed in the U.S. Letters Patent to Dahan 3,476,246 and Brown et al 3,650,406.

One problem with known prior art devices is that they have not proved economically feasible for use in large scale contaminant recovery operations. As an example, large open sea oil spills are typically combatted with detergents and other chemicals to the undesirable result that very little oil is recovered in these operations. Moreover, the detergents often prove more harmful to marine life than the oil itself.

One reason that prior art collection systems generally have proved infeasible is that they virtually all require the use of pumps at some point during the retrieval process. It can be appreciated that such a requirement might be overly burdensome particularly in cases where extremely large volumes of oil must be recovered. Further in this regard, many of the prior art systems retrieve a mixture of contaminant and water even in calm water rather than recovering only the contaminant itself. Hence, such systems require time consuming separation processes to remove the residual water from the contaminants.

Accordingly, it is an important object of my invention to provide a low cost contaminant retrieval system capable of recovering large volumes of surface contaminants from a body of water without the need for high-volume pumping devices and operating expenses appertenant thereto.

It is a further important object of my invention to provide a contaminant retrieval system which collects liquid surface contaminants on a body of relatively calm water in such manner that it is unnecessary to subsequently separate residual water from the collected contaminants.

In the drawings:

FIG. 2 is an enlarged, fragmentary, front elevational view showing a section of the flexible barrier;

FIG. 3 is an enlarged, fragmentary, vertical cross-sectional view showing the coupling between the flexible barrier and the intake tube;

FIG. 4 is an enlarged, fragmentary, vertical cross-sectional view showing details of construction of the buoyant posts;

FIG. 5 is an enlarged, fragmentary, vertical cross-sectional view of the flexible fence;

FIG. 6 is an enlarged, fragmentary, vertical cross-sectional view similar to FIG. 3 and additionally showing an optional buoyant skimmer; and FIG. 7 is an enlarged, fragmentary cross-sectional view taken along line 7—7 of FIG. 6.

Figure 1:
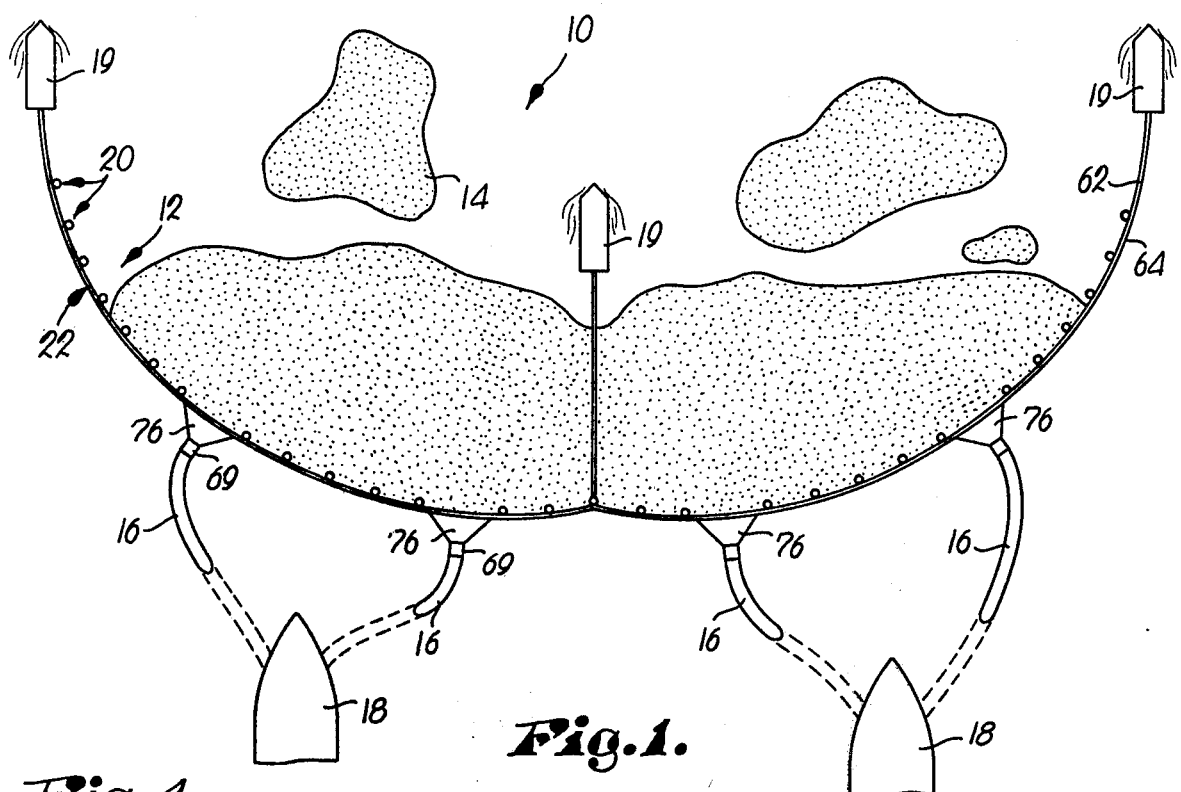
FIG. 1 is a top plan view of a device for retrieving oil spills on surface water constructed in accordance with the principles of the present invention.

An oil retrieval system 10 is shown in FIG. 1 and includes an elongate, upright, flexible barrier 12 adapted to be towed along the surface of a body of water for collecting surface contaminants thereupon such as oil 14, and a plurality of oil intake tubes 16 for receiving the oil 14 and transmitting it to closed reservoirs such as tankers 18. Though the embodiment disclosed shows propulsion of the barrier 12 by a number of towing ships 9, it is to be understood that the present invention might simply be powered by prevailing winds during collection operations.

The barrier 12 includes a series of buoyant, normally upright, laterally spaced, supporting posts 20, and an elongate, horizontally disposed, flexible fence 22 supported on the posts 20 in such a manner that its transverse axis is maintained substantially upright. As shown for example in FIG. 2, the posts 20 are partially submerged each having a lower end section 24 disposed below the waterline 26 and an upper end section 28 projecting upwardly from the latter.

The flexible fence 22 comprises four parallel, laterally offset cables 30 sandwiched between sheets of synthetic resin impregnated material 32. The outermost cables 30 define respectively a top margin 34 and bottom margin 36 for the fence 22. When the fence 22 is supported on the posts 20, the bottom margin 36 is disposed below the waterline 26 whereas the top margin 34 is carried above and spaced from the waterline 26. A plurality of mounting loops 38 are mounted at spaced locations along the length of margins 34 and 36 for the purpose of providing an attachment means to secure the fence 22 on the posts 20.

Each post 20 comprises a tubular shank 40 filled with buoyant material 42 such as styrofoam or the like, and an annular, metal jacketed float 44 coaxially supported on the shank 40 and adjustable along the length thereof to permit variation in the height of the upper end section 28. To this end, there is provided a vertical series of horizontally extending apertures 46 in the shank 40 and a pair of mating retainer pins 48 releasably engageable with respective apertures 46 to capture the float 44 therebetween such that the latter is precluded from moving along the longitudinal axis of the shank 40 when the pins 48 are in place.

The top portion of upper end section 28 has a cap 50 which presents a mounting hole 52 adapted to be coupled with a respective loop 38 on top margin 34 in any conventional manner. Similarly, there is provided a collar 54 coaxially carried on the lower end section 24 for sliding movement along the axis of shank 40 and provided with a mounting hole 52 adapted to be coupled with a respective mounting loop 38 on the bottom margin 36. A third retainer pin 48 is releasably engageable with apertures 46 to selectively preclude movement of the collar 54 toward the cap 50.

A ballast 56 is provided at the bottom of the lower end section 24 for the purpose of holding the post 20 in its normally upright position. There is also provided at the bottom of section 24 a rudder 58 rendering the post 20 steerable in the body of water. Though not shown, it is contemplated that in the wind powered, self-propelled embodiment of the barrier 12, rudders 58 may be remotely controllable whereby the barrier 12 could be navigated as desired in the body of water.

It is anticipated that the length of the fence 22 (and hence the length of barrier 12) may be varied in accordance with the size of the recovery operation undertaken. For example, in large scale open sea uses, fence 22 may be many miles long whereas in localized limited recovery applications, the fence 22 may be only a few hundred yards long. In this connection, there is provided a number of splicing bars 60 along the length of the fence 22 which permit adjustment in the length of the latter to suit the needs of a particular recovery operation.

Alternatively, it is contemplated that a self-supporting fence might be provided to define the barrier 12, thereby eliminating the need for posts 20. Such a construction would facilitate deployment of the barrier 12 and would be particularly well suited for use in small scale oil retrieval operations.

As shown for example in FIG. 1, the barrier 12 has a contaminant engaging front face 62 and an opposed back face 64. A number of rectangular passages 66 extend between the faces 62 and 64 at spaced locations along the length of fence 22. Hence, there is provided an escapement path for the oil 14 collected by the barrier 12 such that the oil 14 may be conveyed to the tankers 18 in a manner to be described.

The intake tubes 16 have a mouth 68 normally carried at the waterline 26 by floatation means in the form of an inflatable bladder 70, and a normally submerged outlet end 72 adapted to be coupled with a submerged inlet 75 in the hull of tanker 18. The mouth 68 is defined by a rigid duct 69 of generally rectangular cross-section and may be opened and closed by a weir-type gate 74 housed within the duct 69. The gate 74 is of the unidirectional variety permitting flow through the mouth 68 only in a direction toward the outlet end 72 of tube 16.

Each intake tube 16 is coupled with a respective passage 66 by a flexible conduit 76. As shown for example in FIG. 2, the passages 66 are of a larger cross-sectional area than the mouths 64 such that each conduit 76 tapers toward its respective mouth 68 to present a frustum configuration. The conduits 76 are rendered flexible by virtue of being constructed from material similar to that used in fabricating fence 22 and hence, each mouth 68 is permitted to shift vertically relative to its respective passage 66. Consequently, the inflatable bladder 70 may be adjusted to position mouth 68 at a desired elevation without also requiring similar adjustment of the barrier 12.

At this point, it is important to understand that by supporting mouth 68 at the waterline 26, oil 14 is conveyed through the intake tubes 16 by gravity flow along thereby eliminating the need for extensive pumping equipment. Further, precise positioning of the mouth 68 functions to separate the oil from the body of water with the intake of only limited amounts of residual water. Of course, it is appreciated that in operation in rough open seas a significantly greater amount of water will be taken on than when operating on relatively calm inland waterways. In any event, the arrangement of the present invention appreciably reduces the amount of water carried to the tankers 18 during inflow of the oil 14.

When operating in open seas where large amounts of residual water will likely be admitted into the intake tubes 16, it may be desirable to provide tankers 18 with separator means to segregate the residual water from the recovered contaminants. In the case of oil recovery, the tankers 18 can simply be operated as large setting tanks, using bilge pumps (not shown) to expel residual water which collects at the bottom of the tankers 18. Recovery of other surface contaminants may require the use of specially equipped separator ships coupled directly with the intake tubes 14, tankers 18 then being used to transport separated contaminants from the separator ships to any desired location.

As shown in FIG. 2, the passages 66 are provided with a grid work of oil cutting bars 78 for the purpose of reducing large masses of oil prior to their being received within the mouth 68. Such an arrangement is particularly important in operations near the polar circles inasmuch as cold oil has a tendency to coagulate in jelly-like masses.

To further enhance the separating capability of the retrieval system 10, each of the conduits 76 may be provided with a skimmer 82 as shown for example in FIGS. 6 and 7. The skimmers 82 are particularly advantageous in calm water applications; it is anticipated that use of skimmers 82 in such operations will obviate the need for subsequent separating processes.

Each skimmer 82 comprises a ribbed plate 84 supported in a generally horizontal disposition within a respective conduit 76 and swingably mounted to the bottom of a corresponding duct 69 by a pivot 86 for up and down oscillation. A number of parallel ribs 88 on the plate 84 are spaced apart by rows of apertures 90 adapted to promote oil/water separation. The plate 84 has a float 92 along its leading edge spaced from the pivot 86 from maintaining the plate 84 in a desired position relative to the waterline 26.

While the embodiment disclosed in the drawings shows each mouth 68 in an upright or vertical position, it is contemplated that the mouths 68 could also be disposed horizontally in applying the principles of the present invention. In this regard each duct 69 would be floatingly supported forwardly of the barrier 12 in such manner as to dispose mouths 68 at the waterline 26. Of course, cutting bars 78 would also be carried horizontally at the waterline 26 and structure analogous to skimmers 82 would be provided for the horizontally disposed mouths 68.

When using the system 10 for example to retrieve an oil spill, a sufficient length of flexible fence 22 and supporting posts 20 are deployed to present a flexible barrier 12 configured substantially as shown in FIG. 1. The towing ships 18 are operated to maneuver the barrier 12 in such a manner as to confine the oil 14 on the body of water.

As the barrier 12 is moved over the surface of the water, the oil 14 will be directed into the rectangular passages 66, conveyed through the conduit 76 to the mouth 68 of an intake tube 16, and finally transported through the tube 16 into an awaiting tanker 18. It is to be noted that the oil 14 is collected from the surface of the water and delivered to the tanker 18 without the need for any type of mechanical pumping equipment. In this connection, the oil 14 is presented to the mouth 68 by the movement of the barrier 12 across the surface of the water and conveyance of the oil 14 from the mouth 68 to the tanker 18 is accomplished by the action of gravity flow.

Of course, the inflatable bladder 70 must be adjusted to provide the desired floatation to the mouth 68 such that a minimum amount of residual water is permitted to flow into the intake tube 16. As previously explained, gravity flow through the tube 16 takes place by virtue of the fact that the mouth 68 is maintained at a level above the inlet 75 in the tanker 18. Note that the restricted unidirectional flow effected by gate 74 precludes backflow of the oil 14 from the tube 16 should shifting surface conditions be encountered.

The above described operation continues until all of the oil 14 has been removed from the body of water. Manifestly, it may be necessary from time to time to temporarily suspend operation for the purpose of permitting a loaded tanker 18 to disengage the intake tubes 16 and to permit another tanker 18 to take its place. In large scale operations, tankers 18 may remain in continuous engagement with respective intake tubes 16, the oil collected in the tankers 18 being transferred from time to time to auxiliary tankers for transport as desired.

Should the oil recovery operation take place in relatively calm water, the action of skimmers 82 will be sufficient to eliminate the need for subsequent separating operations. In this connection, as the barrier 12 moves through the body of water, the skimmer 82 scoops the oil from the surface of the water and directs it rearwardly toward the mouth 68. Any residual water carried with the skimmed oil 14 is allowed to drain through the apertures 90 such that virtually no water is conveyed to the inlet tube 16.

From the foregoing, it can be seen that the present invention offers a practical, highly effective and very efficient means for recovering surface contaminants from a body of water. The unique gravity flow features of the retrieval system 10 makes it economically feasible in operations where prior art devices have proved too costly or ineffective. Thus, my invention significantly contributes to enhancement of the environment and preservation of natural resources.

While my invention has been described in the form of a buoyant transportable retrieval system 10, it is to be understood that similar principles apply to a stationary installation for example in river or coastal regions, on land application around storage tanks or large pipe lines, and other similar uses.

I claim:

1. Recovery apparatus for retrieving surface contaminants from a body of water, said apparatus including:

an elongate, horizontally extending series of buoyant normally upright laterally offset posts at the surface of said body of water, each post being partially submerged in said body and having an upstanding end segment projecting above the water surface;

an elongate, substantially imperforate, flexible fence supported on said series of posts in a partially submerged disposition to present a horizontally extending contaminant barrier projecting upwardly from the surface of the water, said barrier having a contaminant-engaging front side and an opposed back side;

at least one passage formed in said fence permitting contaminant flow through said barrier from said front side to said back side, said passage being partially submerged in said body; a contaminant intake tube for receiving contaminants flowing through said passage, said intake tube having a mouth offset from said passage in proximal relation thereto, and an opposed outlet remote from said mouth;

flexible conduit means intercoupling said passage and said mouth for establishing flow communication therebetween while permitting vertical movement of the mouth relative to the passage;

a floatation device for said mouth buoyantly supporting the latter on the surface of said body of water, said device comprising an inflatable bladder for permitting selective adjustment of the buoyant force on said mouth;

unidirectional gate means in said mouth for permitting only one-way flow of contaminants therethrough in a direction away from said passage; and a reservoir for storing contaminants conveyed through said tube, said reservoir having an inlet coupled with said outlet at an elevation below said mouth whereby contaminants moving through said passage are conveyed to the reservoir by gravity flow, and a skimmer pivotally mounted on said intake tube at said mouth for up and down swinging movement within said conduit, said skimmer being provided with a float for shifting in response to up and down movement of the surface of said body of water, said skimmer including a generally horizontally disposed plate having a plurality of spaced, parallel ribs and rows of apertures intermediate said ribs, whereby to effect separation of oil and water during the recovery process.

* * * * *